(12) United States Patent
Kuo

(10) Patent No.: US 6,790,306 B2
(45) Date of Patent: Sep. 14, 2004

(54) METHOD FOR FORMING A COVER LAYER ON A DISK

(75) Inventor: Tzu-Hau Kuo, Hsin Chu (TW)

(73) Assignee: Ritek Corporation, Hsin Chu Industrial Park (TW)

( * ) Notice: Subject to any disclaimer, the term of this patent is extended or adjusted under 35 U.S.C. 154(b) by 52 days.

(21) Appl. No.: 10/283,697

(22) Filed: Oct. 30, 2002

(65) Prior Publication Data

US 2003/0106636 A1 Jun. 12, 2003

(30) Foreign Application Priority Data

Oct. 30, 2001 (TW) ..................... 090126982 A

(51) Int. Cl.$^7$ ..................... B32B 31/12; B32B 33/00
(52) U.S. Cl. ................ 156/247; 156/273.7; 156/286; 156/289; 156/323; 427/164; 427/296
(58) Field of Search ............... 156/242, 247, 156/272.2, 273.7, 285, 286, 289, 323; 427/164, 296, 294, 402, 407.1, 420, 168

(56) References Cited

U.S. PATENT DOCUMENTS

| | | | | |
|---|---|---|---|---|
| 4,035,590 A | * | 7/1977 | Halter | 369/61 |
| 4,374,077 A | * | 2/1983 | Kerfeld | 264/1.33 |
| 4,492,718 A | * | 1/1985 | Mayer et al. | 427/160 |
| 4,652,498 A | * | 3/1987 | Wolf et al. | 428/461 |
| 5,078,947 A | * | 1/1992 | Nishizawa et al. | 264/1.1 |

\* cited by examiner

Primary Examiner—Richard Crispino
Assistant Examiner—Sing P. Chan
(74) Attorney, Agent, or Firm—Quintero Law Office

(57) ABSTRACT

Method for forming a cover layer on a disk. The method includes a coating step, in which an uncured cover layer is coated on the surface of the disk, and the average thickness of the cover layer is enough to support to the requirement of a predetermined laminating thickness, a laminating step, where a transparent capping board of amorphous olefin polymer is laminated on the uncured cover layer whose thickness is maintained at a predetermined thickness to obtain a smooth surface, an illuminating step, where a UV light source is shined onto the cover layer to harden and cure the cover layer, and a stripping step, where the capping board is stripped from the cured cover layer.

28 Claims, 3 Drawing Sheets

METHOD FOR FORMING A COVER LAYER ON A DISK

BACKGROUND OF THE INVENTION

Detailed Description of the Invention

The present invention relates to a method for forming a cover layer on a disk. In particular, the invention involves the formation of a cover layer on a disc that must meet the high accuracy requirement of new generation disks.

Ever since the development of compact disc (CD) in the early 80's, research into disks with greater capacity and better quality and related applications are continuously in progress. For instance, high-capacity Digital versatile Disc (DVD) went public in 1997, with capacity increasing from hundreds of megabytes (MB) to gigabytes (GB). For example, from a single-sided and single-layer DVD 5 (4.7 GB) to a double-sided and double-layer DVD 18 with a capacity of 18 GB. Nevertheless, this improvement on capacity is still considered inadequate for the display and recording of digital broadcasting and high density TV (HD-TV). As a result, High Density DVD (HD-DVD) having greater capacity are currently under intensive development.

Generally speaking, the method of increasing the storage capacity of discs could be achieved by either using a laser source having a shorter wavelength or by increasing the Numerical aperture(NA) of the objective lens. Currently, HD-DVD is using the methods as mentioned above to increase capacity of discs. For HD-DVD, compared to DVD, blue laser having 405 nm wavelength (650 nm for DVD) and numerical aperture is relatively increased to 0.85 (0.6 for DVD). In doing so, the storage capacity of discs could be increased to 25 GB, and even 50 GB. This conforms to the requirement of the recording capacity for the 133 min program for high display quality television.

This new generated type of discs, like the HD-DVD disc, adopts a relatively high NA, allowing increased storage density. However, it also causes adverse image aberration, such as increased spherical aberration, coma and astigmatism, In addition, the thickness of the cover layer must be reduced to compensate for the higher NA value. Using a DVR disc 10 under development as an example, basic structure is shown in FIG. 1, where 11 represents the substrate, 12 represents the structure of the recording layer, and 13 represents a cover layer 13, wherein thickness of the cover layer 13 is adjusted from 0.6 mm (for DVD) to merely 0.1 mm. Furthermore, due to image aberration, the working accuracy for the surface of the cover layer must be increased as well, or a tiny thickness difference can cause image aberration and distortion.

The conventional cover protection layer for CD discs is using lacquer, the protective lacquer layer is under the printing layer of the disc. This lacquer is mostly coated onto CDs by spin coating (curtain coating or pastering could be used as well). Then the lacquer is quickly cured under ultraviolet (UV) light. The cured surface is a finished protective layer having high hardness. As various formulations for the lacquer exhibit different reaction rates, some lacquers cure instantly, and others lose their fluidity and plasticity slowly, curing gradually. This time period before curing may be a few hours or even longer, depending on various applications.

As mentioned above, there is a specific thickness requirement of the cover layer (0.1 mm) for the new generation of discs. When the cover layer is formed by spin coating, due to lacquet's viscosity, distribution of fluidity, intrinsic characteristics and curing time, the actual coating usually results in uneven distribution of thickness. The result of spin coating is shown in FIG, 2, where two ends 211 and 212 of the uncured cover layer 21 exhibit coagulation due to surface tension. In addition, when observed on a microscopic scale, the surface of the cover layer also illustrates an uneven plain (refer to FIG. 5). Having a surface that is not planar and the thickness not even and uniform increases the error rate when reading data. It is judged from the experimental results that it is difficult to control the cover layer thickness variation within an acceptable range of ±3% (that is 0.1+0.003 mm). In actual production, almost each disc exhibits its distinct surface distribution characteristics, thus yields of discs are seriously affected, and production costs go up.

In order to overcome the above problems, an object of the invention is to provide a more stable method for forming as a cover layer on a disc, thereby obtaining a cover layer having an even and smooth surface that meets the accuracy requirement for disc reading and recording.

Refer to FIGS. 3, 4 and 5, which illustrate the formation of the cover layer according to the invention. A cover layer (e.g. uncured lacquer) is formed evenly by spin coating or any other suitable method on the recording layer 12 on the substrate 11 of a HD-DVD disc. This cover layer is mostly fluid, and does not harden before curing. For example, an uncured cover layer 31 only hardens when exposed under ultraviolet (UV) light. Average thickness of the uncured cover layer 31 must be enough to meet the required predetermined thickness after curing (or after pressing). In general situations, uncured cover layer must be greater than the predetermined laminating (press) thickness, for example, 0.1 mm. There may be some exceptions, such as when a substance that swells after reaction is used, in which the predetermined thickness of the cover layer can be relatively thinner. Then a capping board 41 is used to press against the uncured cover layer 31, thereby maintaining the predetermined thickness, as shown in FIG. 4. By doing so, the uncured cover layer 31 between the capping board 41 and the substrate 11 is pressed, thus the rising surface 311 moves in the direction of the arrow (FIG. 5), and the dent portion 314 rises in the direction of the arrow simultaneously. Similarly, uneven surfaces, such as ridges 312, 313 and dent portions 315, 316 are squeezed by the undersurface 411 of the capping board 41 to form a smooth and flat surface. In such a way, the surface of the cover layer is able to meets the requirement of the planarity of cover layer.

As the uncured cover layer may be UV curable cationic lacquer, or free radical lacquer, which all cure after exposure to UV light. However, for cationic lacquer, the difficulty associated with the curing step is to quickly press the capping board 41 onto the cover layer 31 before the uncured cover layer cures thereby repairing and maintaining a flat and smooth surface at a microscopic scale (the tolerance for cover layer thickness variation is within ±3%). This can only be achieved by appropriate cooperation between the reactants in the cover layer and the curing time, and a suitable UV radiation and cover time must be applied.

Another way to achieve the above results is to use a capping board 41 having good transparency. The need to cure the lacquer layer makes it very important for the capping board to be transparent. Since most of the lacquer used is UV curable, the UV light must pass through the capping board and reach the lacquer layer to cure the lacquer. If the capping board absorbs UV light or scatter (diffuse?) UV is light, the curing may not be completed, causing adverse effects on the quality of HD-DVD discs. In the case where the capping board exhibits good transparency, the curing process is not as restricted by the covering time. The harden and curing effects can then be achieved by applying UV light through the capping board to the cover layer.

Another issue concerning the capping board is the stripping thereof after the cover layer is cured. Adhesion between the capping board and the lacquer layer after curing makes stripping very difficult, since the detachment may occurs not at the interface between the capping board and the cured lacquer layer, but at either the interfaces between the cured lacquer layer and recording layer 12 or between the recording layer and the substrate. It is essential to avoid detachment at interfaces other than between the capping board and the cured lacquer layer.

In order to ensure correct detachment, it is necessary to make the adhesion strength at this interface lower than other interfaces. This is achieved by choosing a material having low surface tension.

From the discussion above, it is clear that the requirement of the material for capping board includes transparency and low surface tension. Amorphous olefin polymer is the very suitable material for this purpose due to its high transparency and low surface tension. Also, amorphous olefin polymer can be easily made as a capping board with very flat surface by injection molding.

Experimental results show that an amorphous olefin polymer disc with diameter of 12 cm and thickness of 0.6 mm can be easily removed from the cured lacquer layer of a HD-DVD disc, The stripping was done by hand and a very smooth and uniform cover layer is obtained. In production, a process similar to cured DVD-14 and DVD-18 production can be used. In the production of DVD-14 and DVD-18, a PMMA disk has to be removed from the aluminum reflecting layer of the half disk. This removal of PMMA disk from reflecting layer is very similar to the removal of capping board from the cured lacquer layer (cover layer) in this invention. Therefore, the implementation of this invention is highly applicable.

According to the experimental results, when amorphous olefin polymer is used as the base of the capping board 41, or at least as the undersurface of the capping board which contacts the uncured cover layer 31 directly, the capping board 41 can be easily detached from the cover layer 31 due to the chemical structure of the polyolefin. This allows easy detachment of the capping board from the cover layer. In addition, the amorphous olefin polymer is transparent in nature, not absorbing UV light, and exhibits toughness. As shown in FIG. 6, the results prove that the capping board 61 of amorphous olefin polymer accomplishes good flattening effects, a tolerance for cover layer thickness variation within ±2% or less is achieved for the surface 621 of the cover layer 62. Better working conditions result in even more tolerance, and an extremely flat surface is obtained. Amorphous olefin polymer, having good toughness and relatively low surface tension, allows easy detachment of capping board from all kinds of uncured cover layer.

Advantages of using amorphous olefin polymer include high plasticity, low cost, and production of a pure flat surface by injection molding. In addition, its characteristics of mechanical workability and thermal process are also advantageous where different methods can be used to make a specific surface that exhibits the required characteristics. For instance, it is possible to adopt low temperature polishing, slicing or thermal melting to produce the required capping board, thus reducing associated production costs effectively.

A complete flat surface is obtained after stripping the capping board 41 from the cured (or hardened) cover layer. Also, the thickness of the cover layer is exactly the predetermined thickness which greatly improves the workability accuracy of the surface of the cover layer. An identical data reading/writing is achieved by the even thickness of the cover layer from the center to the outer portion of the disc. Errors are minimized at the lowest level, thereby greatly increasing the yield of discs, and quality is maintained at the highest level.

As described earlier, since the uncured cover layer 31 is fluid before exposure to UV light, a more delicate process can be achieved by laminating the capping board 71 and the uncured cover layer 31 in vacuum, thus further reducing the possibility of air between the capping board and the cover layer. Another method is to make a capping board 71 having undersurface 711a as shown in FIG. 7a, the center portion of the capping board extending below its circumferential edge, or the undersurface 711b can be convex, as shown in FIG. 7b. With undersurfaces as described, the surface of the cover layer is flattened, and air is pushed from the center of the disc outward to the circumference of the disc, thus avoiding air remaining between the capping board and the cover layer, With capping boards having undersurfaces as described, the angle and the radian from the inner ring to the outer ring of the disc must be maintained within the tolerance of reading/writing inaccuracy.

In conclusion, the invention provides a more stable formation of cover layers on discs, which helps in the production of the new generation of higher capacity discs. In addition, the amorphous olefin polymer used exhibits transparency, plasticity and low adhesion, meeting the process requirements of the cover layer. It can be used in various conditions where different cover layers are used. Yield of disc production is increased and production costs are effectively reduced. As a result, the invention provided is a promising method that is highly effective in disc processes.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated, All such modifications and variations are within the scope of the present invention as determined by the appended claims when interpreted in accordance with the breadth to which they are fairly, legally, and equitably entitled.

LIST OF NOTATIONS

Figure 1:
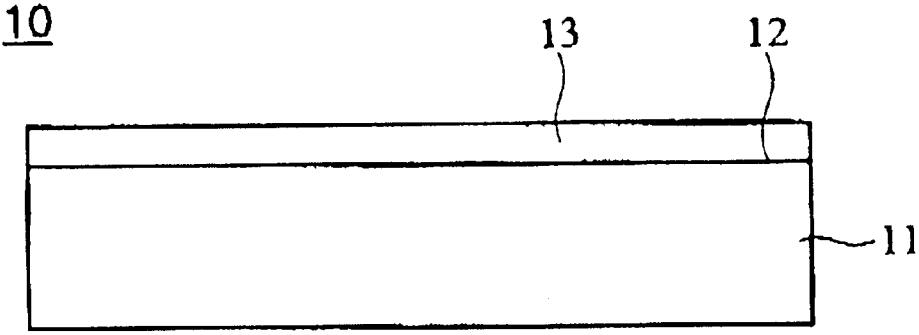
FIG. 1 illustrates the basic structure of a HD-DVD disc.
Figure 2:
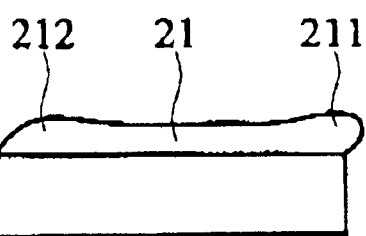
FIG. 2 illustrates an actual coating result of the cover layer.
Figure 3:
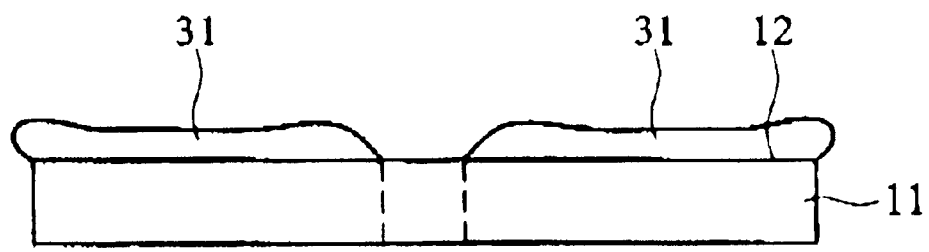
FIG. 3 illustrates the cover layer after coating according to the invention.
Figure 4:
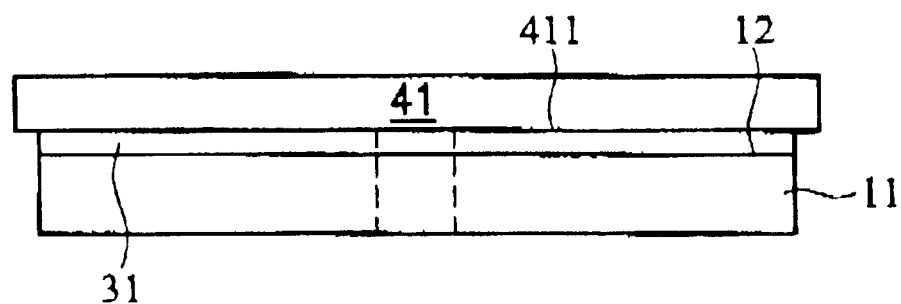
FIG. 4 illustrates the capping board pressing against the cover layer according to the invention.
Figure 5:
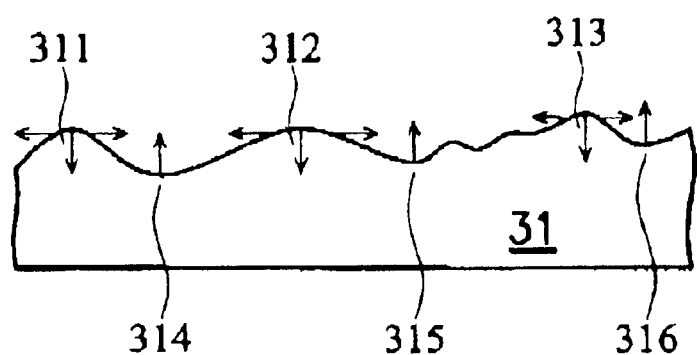
FIG. 5 illustrates microscopically the surface of the cover layer when pressed according to the invention.
Figure 6:
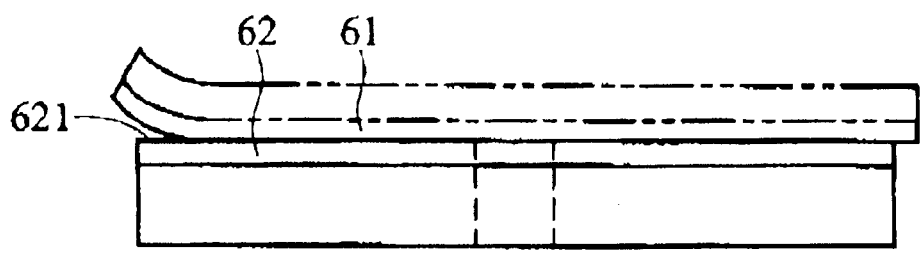
FIG. 6 illustrates the stripping of the capping board from the cover layer according to the invention.
Figure 7:
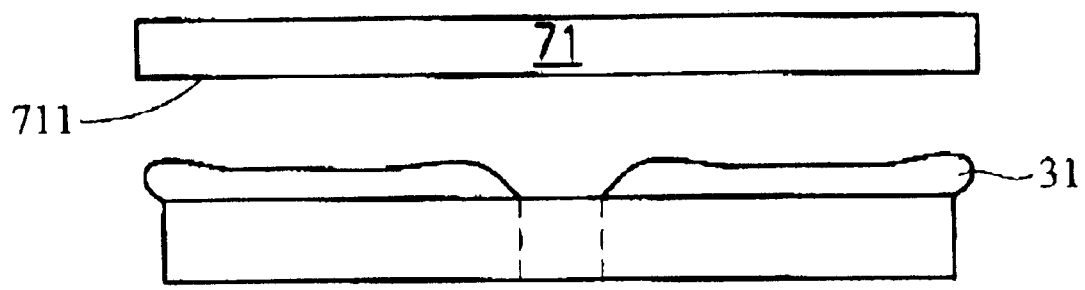
FIG. 7 illustrates the undersurface of the capping board according to the invention.
Figure 7A:
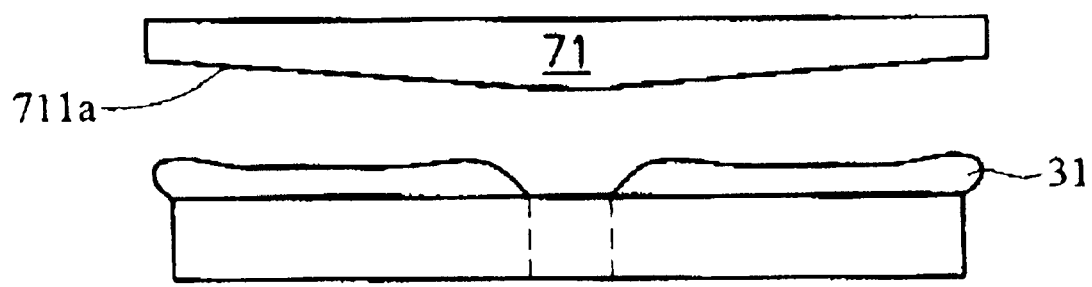
FIG. 7a illustrates one example of the undersurface of the capping board according to the embodiment.
Figure 7B:
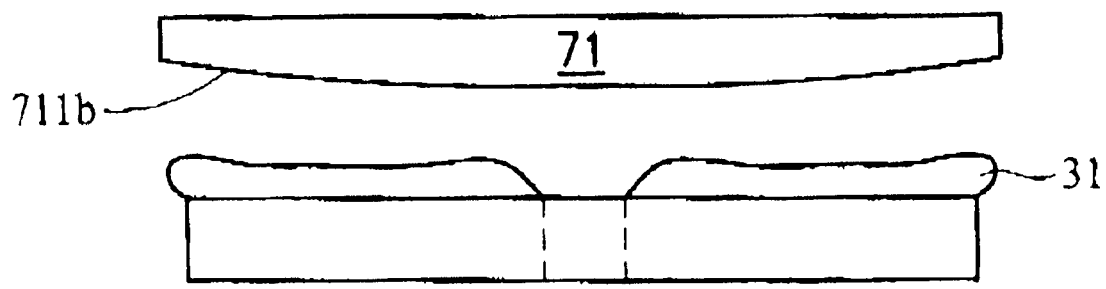
FIG. 7b illustrates another example of the undersurface of the capping board according to the embodiment.

10~DVR discs; 11~substrate; 12~recording layer structure; 13~cover layer; 211~right side of the cover layer; 21~cover layer; 212~left side of cover layer; 31~cover layer; 311, 312,313~rising surface; 41~capping board; 314, 315, 316~dent portion; 411~undersurface of the capping board; 61~capping board; 62~cover layer; 621~surface of the cover layer; 71~capping board; 711~undersurface of the capping board.

What is claimed is:

1. A method for forming a cover layer on a disk, comprising:
   a coating step, where an uncured cover layer is coated on the surface of the disk, and the average thickness of the uncured cover layer is enough to support the requirement of a predetermined thickness;
   a laminating step, where a transparent capping board of amorphous olefin polymer is laminated on the uncured cover layer, such that the cover layer is maintained at the predetermined thickness to achieve a smooth surface;
   an illuminating step, where a light source is shined onto the cover layer to harden and cure the cover layer; and
   a stripping step, where the capping board is stripped from the cured cover layer.

2. The method as claimed in claim 1, wherein the coating step is spin coating.

3. The method as claimed in claim 1, wherein the coating step is curtain coating.

4. The method as claimed in claim 1, wherein the thickness of the cover layer coated in the coating step is slightly greater than a predetermined squeezed thickness to meets the requirement of the predetermined laminating thickness.

5. The method as claimed in claim 1, wherein the capping board is laminated onto the uncured cover layer in vacuum to decrease air there between.

6. The method as claimed in claim 1, wherein the transparent capping board of amorphous olefin polymer used in the laminating step is produced by injection molding.

7. The method as claimed in claim 1, wherein the transparent capping board is produced by mechanical reworking to form a specific undersurface.

8. The method as claimed in claim 1, wherein the transparent capping board is produced by thermal process to form a specific undersurface.

9. The method as claimed in claim 1, wherein the undersurface of the capping board is close to pure flat surface.

10. The method as claimed in claim 1 wherein the undersurface of the capping board is convex.

11. The method as claimed in claim 1, wherein the center portion of the undersurface of the capping board extends below its circumferential edge.

12. The method as claimed in claim 1, wherein the light source of the illuminating step is ultraviolet.

13. The method as claimed in claim 1, wherein the light source passes through the transparent capping board to the cover layer.

14. The method as claimed in claim 1, wherein the cured cover layer has a thickness variation within ±2% or less.

15. A method for forming a cover layer on a disk, which includes a laminating step and a stripping step to obtain a cover layer on a disc that is smooth as the undersurface of a capping board, the method comprising the steps of:
   laminating a transparent capping board of amorphous olefin polymer onto a disc having an uncured cover layer such that a predetermined thickness is maintained between the transparent capping board and the disk; and
   stripping the capping board from the cover layer after the cover layer cures.

16. The method as claimed in claim 15, wherein the lamination at the capping board onto the disc having a plastic cover layer is performed in vacuum.

17. The method as claimed in claim 15, wherein the undersurface of the capping board is close to a pure flat surface.

18. The method as claimed in claim 15, wherein the undersurface of the capping board is convex.

19. The method as claimed in claim 15, wherein the center portion of the undersurface of the capping board extends below its circumferential edge.

20. The method as claimed in claim 15, wherein the cover layer is cured to ultraviolet light.

21. The method as claimed in claim 15, wherein the uncured cover layer is cured after its surface is exposed to ultraviolet light.

22. The method as claimed in claim 15, wherein the cured cover layer has a thickness variation within ±2% or less.

23. A method for forming a cover layer on a disk, wherein a recording layer is formed on the disk, the method comprising the steps of:
   coating an uncured cover layer on the surface of the recording layer of a disc in such a way that the average thickness of the cover layer meets the requirement of a predetermined thickness;
   laminating a transparent capping board of amorphous olefin polymer onto the uncured cover layer such that a predetermined thickness is maintained between the transparent capping board and the disk;
   subjecting the capping board and the disc to ultraviolet light to cure the cover layer; and stripping the capping board from the cured cover layer.

24. The method as claimed in claim 23, wherein the lamination of the transparent capping board onto the uncured cover layer is carried out in vacuum.

25. The method as claimed in claim 23, wherein the cured cover layer has a thickness variation within ±2% or less.

26. A method for forming a cover layer on a disk, wherein a recording layer is formed on the disk, the method comprising the steps of:
   coating an uncured cover layer on the surface of the recording layer of a disc in such a way that the average thickness of the cover layer meets the requirement of a predetermined thickness;
   subjecting the cover layer to ultraviolet (UV light source) to initialize the reaction;
   laminating a transparent capping board of amorphous olefin polymer onto the cover layer before the curing of the cover layer such that a predetermined thickness is maintained between the transparent capping board and the disk;
   subjecting the cover layer to ultraviolet light through the capping board to cure the cover layer; and
   stripping the capping board from the cured cover layer.

27. The method as claimed in claim 26, wherein the lamination of the transparent capping board onto the cover layer is carried out in vacuum.

28. The method as claimed in claim 26, wherein the cured cover layer has a thickness variation within ±2% or less.

* * * * *

UNITED STATES PATENT AND TRADEMARK OFFICE
CERTIFICATE OF CORRECTION

PATENT NO. : 6,790,306 B2  
APPLICATION NO. : 10/283697  
DATED : November 29, 2005  
INVENTOR(S) : Eiki Matsuo Page 1 of 1

It is certified that error appears in the above-identified patent and that said Letters Patent is hereby corrected as shown below:

Column 8, TABLE 2, example 5, line 2, col. 3: "-1.7428E-02" should be -- -1.7248E-02 --

Column 9, TABLE 2 continued, line 2, col. 3: "-1.6385E-.03" should be -- -1.6385E-02 --

Column 11, TABLE 4 continued, example 9, line 5, col. 4: "-9.5861E-03" should be -- -9.5681E-03 --

Column 13, TABLE 6, example 11, line 2, col. 6: "2.6413E-02" should be -- 3.6413E-02 --

Column 13, TABLE 6, example 12, line 6, col. 2: "26.238" should be -- 26.328 --

Column 13, TABLE 6, example 14, line 2, col. 3: "-7.8619E-03" should be -- -7.8916E-03 --

Column 15, TABLE 7 continued, under example No. 13, line 3: "0.98" should be -- 0.96 --

Column 15, TABLE 7 continued, last line, col. 3: "1.26" should be -- 1.28 --

Column 15, Line 50, claim 1: "1.0t" should be -- $1.0 < t$ --

Signed and Sealed this

Twenty-first Day of November, 2006

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 6,790,306 B2 | Page 1 of 1 |
| APPLICATION NO. | : 10/283697 | |
| DATED | : September 14, 2004 | |
| INVENTOR(S) | : Tzu-Hau Kuo | |

It is certified that error appears in the above-identified patent and that said Letters Patent is hereby corrected as shown below:

This certificate supersedes Certificate of Correction issued November 21, 2006, should be vacated since no Certificate of Correction was granted for this patent number.

Signed and Sealed this

Twenty-seventh Day of February, 2007

JON W. DUDAS
*Director of the United States Patent and Trademark Office*